United States Patent [19]

Kubota et al.

[11] 4,433,475
[45] Feb. 28, 1984

[54] COIL INSERTION APPARATUS

[75] Inventors: Tadashi Kubota, Katano; Tokuhito Hamane, Hirakata; Masaaki Tasai, Kadoma, all of Japan

[73] Assignee: Matsushita Electric Industrial Co., Ltd., Kadoma, Japan

[21] Appl. No.: 321,928

[22] Filed: Nov. 16, 1981

[30] Foreign Application Priority Data

Nov. 21, 1980 [JP] Japan .................. 55-164973

[51] Int. Cl.³ .......................................... H02K 15/06
[52] U.S. Cl. ....................................... 29/736; 29/596
[58] Field of Search ............... 29/736, 732, 734, 596, 29/606

[56] References Cited

U.S. PATENT DOCUMENTS 4,047,293 9/1977 Kieffer .................. 29/736
4,304,045 12/1981 Barrera ................. 29/736

Primary Examiner—Carl E. Hall
Attorney, Agent, or Firm—Wenderoth, Lind & Ponack

[57] ABSTRACT

An improved coil insertion apparatus for inserting coils, for example, into stator cores of electrical rotary machines, in which blades and a coil pusher of the apparatus are arranged to be movable at optimum timing and speed suitable for various winding specifications of stators so as to make it possible to efficiently insert coils having low coil ends and a short circumferential length into stator cores, with simultaneous reduction of coil inserting resistance.

5 Claims, 13 Drawing Figures

COIL INSERTION APPARATUS

The present invention generally relates to an apparatus for manufacturing, for example, stators of electrical machines, and more particularly to a coil insertion apparatus for inserting coils into stator cores of electrical rotary machines and the like.

Figure 1:
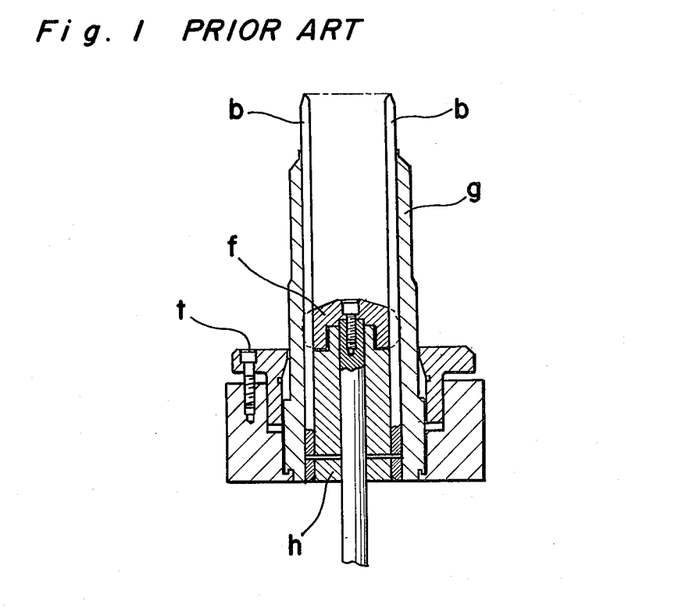
FIGS. 1 to 3 are fragmentary sectional views showing arrangements in conventional coil insertion apparatuses (already referred to).
Figure 2:
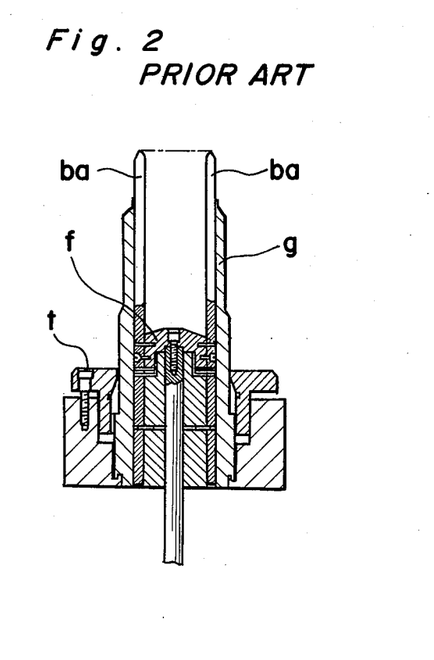
Figure 3:
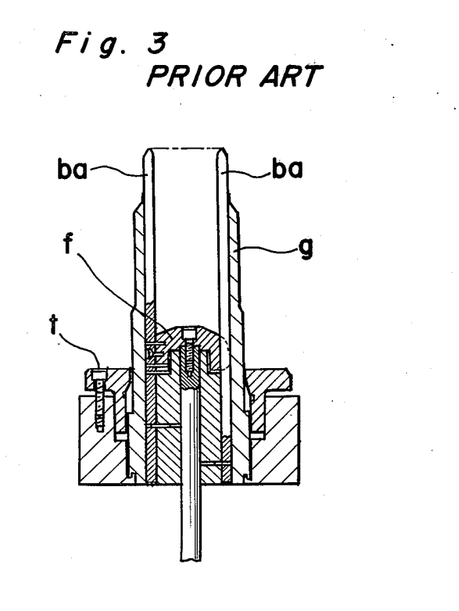

Conventionally, there have been proposed a coil insertion apparatus generally referred to as the fixed blade type and having all the blades b fixed to a blade holder h as shown in FIG. 1, and other coil insertion apparatuses commonly referred to as movable blade type and having all the blades or part of the blades (for example, blades ba) secured to a coil pusher f as shown in FIGS. 2 or 3.

In the known fixed blade type coil insertion apparatus of FIG. 1 as described above, however, the coil (not shown) tends to be damaged during insertion thereof into a stator core (not shown) due to a large frictional resistance between the blades b and the coil, and moreover, diameters of wires of coils which can be inserted by the apparatus are limited to a large extent. On the other hand, in the prior art movable blade type coil insertion apparatuses of FIGS. 2 and 3 referred to above, although they are advantageous in that the coil insertion resistance may be reduced, there have been such inconveniences that, since the coil is axially pushed up more than necessary due to restriction on the movement of the coil in a direction at right angles with respect to the inserting direction by the movable blades ba rising together with the coil pusher f during insertion of the coil, it is necessary to preliminarily arrange the length of coil ends so as to be longer by that extent. Accordingly, there has been a restriction that the known apparatuses as described above can not be used for stators having windings whose circumferential length is reduced as far as possible to lower both coil ends of the stators for making the size of the electrical machines compact, since abnormal forces are exerted on the movable blades ba and the coil to be dealt with.

Moreover, in the case where, for example, two kinds of coils, i.e. a coil having a small insertion resistance and another coil having a large insertion resistance are required to be inserted into the same stator core, it has been necessary to provide corresponding two kinds of coil insertion apparatuses of the fixed blade type and the movable blade type, since change-over from the fixed blade type to the movable blade type or vice versa can not readily be effected in general.

Furthermore, in both the known fixed blade type and movable blade type coil insertion apparatuses as described above, when the thickness of the stator core is to be changed, there has been required a procedure in which bolts t in FIGS. 1 to 3 are loosened, the distance between the tips of the blades b and ba and the tip of a wedge guide g is set to a value in which a predetermined length is added to the stator thickness, and the bolts t are tightened again. Therefore, there has also been a disadvantage that a considerable period of time is required for such change-over in the production of various stators having different thicknesses.

Accordingly, an essential object of the present invention is to provide an improved coil pusher in which the parts which constitute the apparatus are arranged to be movable at optimum timing and speed suitable for respective winding specifications of stators so as to make it possible to efficiently insert coils having low coil ends and short circumferential length into stator cores, with simultaneous reduction of coil inserting resistance.

Another important object of the present invention is to provide a coil insertion apparatus of the above described type which has a simple construction and functions stably and with high reliability, and can be readily manufactured at low cost.

In accomplishing these and other objects, according to one preferred embodiment of the present invention, there is provided a coil insertion apparatus which comprises a plurality of blade members arranged in an annular configuration at predetermined intervals for guiding a coil into slots formed in a core of a stator for a rotary electrical machine, and a coil pusher adapted to vertically reciprocate in the axial direction of the blade members for inserting the coil into the slots under pressure by utilizing the blades as a guide. The plurality of the blade members are further divided into a plurality of blade groups which are respectively held by separate blade holders for being movably guided in the axial direction independently of each other, and the plurality of the blade holders and the coil pusher are respectively provided with reciprocation driving sections which are independent of each other.

By the arrangement according to the present invention as described above, an improved coil insertion apparatus has been advantageously provided, with substantial elimination of disadvantages inherent in the conventional arrangements of this kind.

These and other objects and features of the present invention will become apparent from the following description of a preferred embodiment thereof and with reference to the accompanying drawings, in which;

Before the description of the present invention proceeds, it is to be noted that like parts are designated by like reference numerals throughout the several views of the accompanying drawings.

Figure 4:
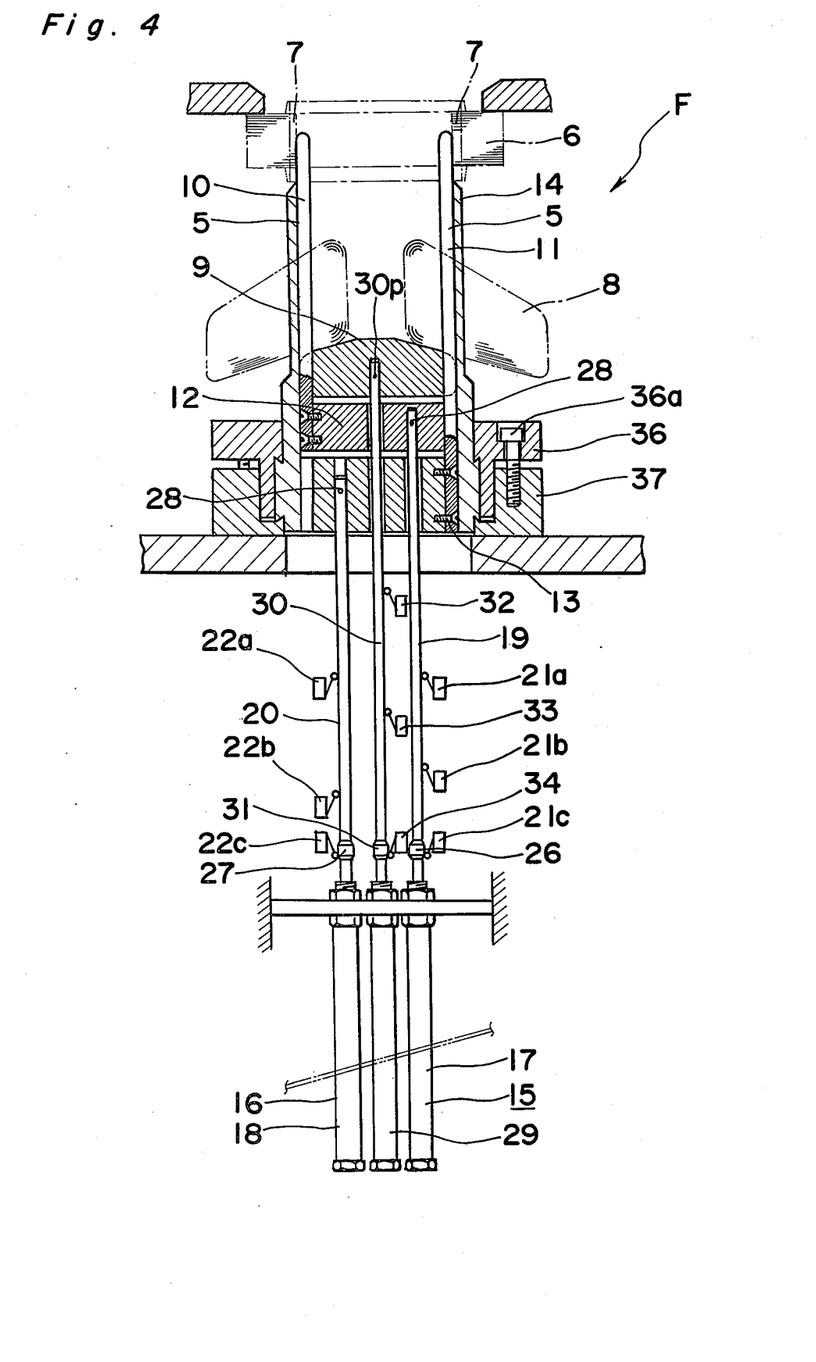
FIG. 4 is a schematic sectional elevational view showing the construction of an improved coil insertion apparatus according to one preferred embodiment of the present invention, in the state where a coil is mounted thereon.
Figure 5:
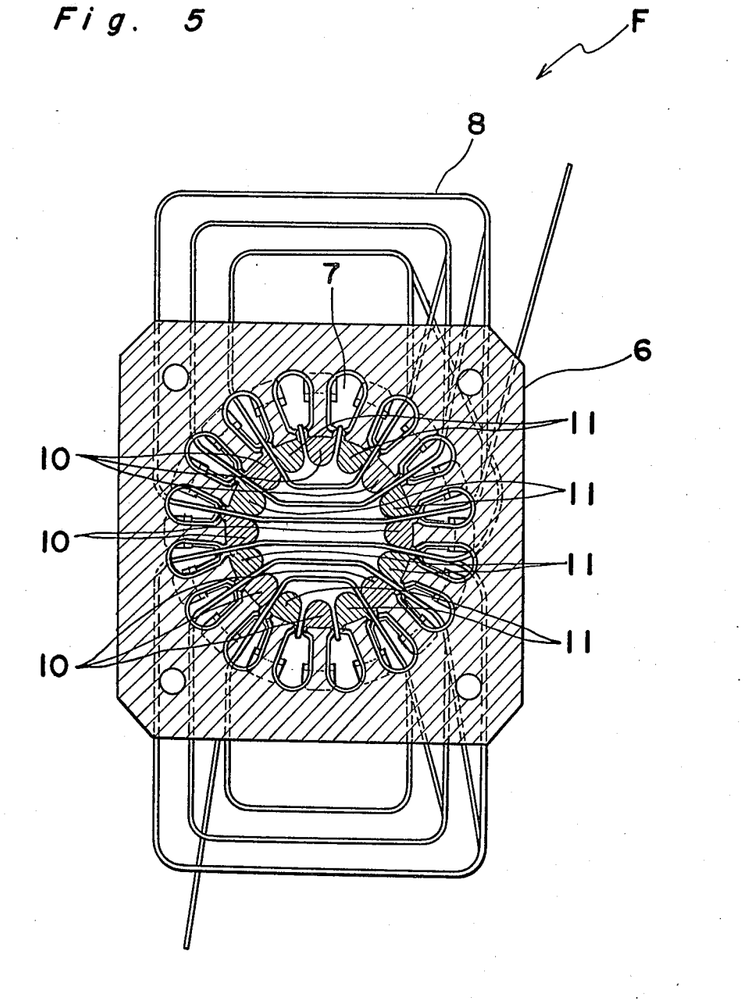
FIG. 5 is a top plan view of the coil insertion apparatus of FIG. 4, FIGS. 6 to 9 are views similar to FIG. 4, which particularly show the sequence of operation of a coil pusher and blades of the coil insertion apparatus of the present invention.

Referring now to the drawings, there is shown in FIGS. 4 and 5 an improved coil insertion apparatus F according to one preferred embodiment of the present invention, which generally includes a plurality of blades 5 arranged in an annular configuration at predetermined intervals for guiding a coil 8 into slots 7 formed in an iron core 6 of a stator for an electrical rotary machine, and a coil pusher 9 adapted to reciprocate in the longitudinal direction of said blades 5 for inserting the coil 8 into the corresponding slots 7 while being guided by the blades 5. The plurality of blades 5 as described above are in two blade groups, i.e. a first blade group 10 and a second blade group 11, respectively secured to a corresponding first blade holder 12 and a second blade holder 13. The blades 5 of the respective blade groups 10 and 11 are guided by a wedge guide 14 for movement in the axial direction in a unit with each of the blade holders 12 and 13.

It is to be noted here that the blades 5 of the above first and second blade groups 10 and 11 are further interspersed with the blades of one group being every other blade, with the coil 8 to be inserted held therebetween (FIG. 5).

The coil insertion apparatus of FIG. 4 further includes a first and second reciprocating blade driving sections 15 and 16 for independently subjecting the first and second blade holders 12 and 13 to vertical reciprocating movements respectively. The blade driving sections 15 and 16 as described above are respectively constituted by hydraulic cylinders 17 and 18, corresponding rods 19 and 20, limit switches 21a, 21b and 21c, and 22a, 22b and 22c, and contact portions 26 and 27 provided on the rods 19 and 20 so as to be brought into contact with said limit switches for selective actuation thereof for carrying out a predetermined sequence of operations of the bladeholders, and the upper ends of the rods 19 and 20 are respectively fixed to the first and second blade holders 12 and 13 by pins 28. For subjecting the coil pusher 9 to the vertical reciprocating movement, there is also provided a pusher driving hydraulic cylinder 29, and the upper end of a rod 30 of the hydraulic cylinder 29 which extends upwardly between the rods 19 and 20 in a parallel relation thereto is secured to the coil pusher 9 by a pin 30p. The rod 30 is provided with a contact portion 31 which is brought into contact with limit switches 32, 33 and 34 disposed along the rod 30 for selective actuation of said limit switches 32, 33 and 34 for carrying out a predetermined sequence of operations of the pusher. The wedge guide 14 is secured to an insertion jig body 37 by a fixing member 36 fixed to said jig body 37, for example, by screws 36a or the like.

The operation of inserting the coil 8 into the slots 7 of the iron core 6 will be described.

The coil insertion apparatus F of FIG. 4 as described in the foregoing is capable of carrying out optimum coil inserting operations corresponding to the number of turns, wire diameter, etc. of the stator coil to be inserted, each of which operations will be explained hereinbelow.

A first method of coil insertion according to the present invention relates to the inserting operation suitable for a coil in which the diameter of the wire forming the coil is comparatively small and more than two turns of wires are to be inserted between the blades 5, and this operation will subsequently be described with particular reference to FIGS. 4 to 8.

Figure 6:
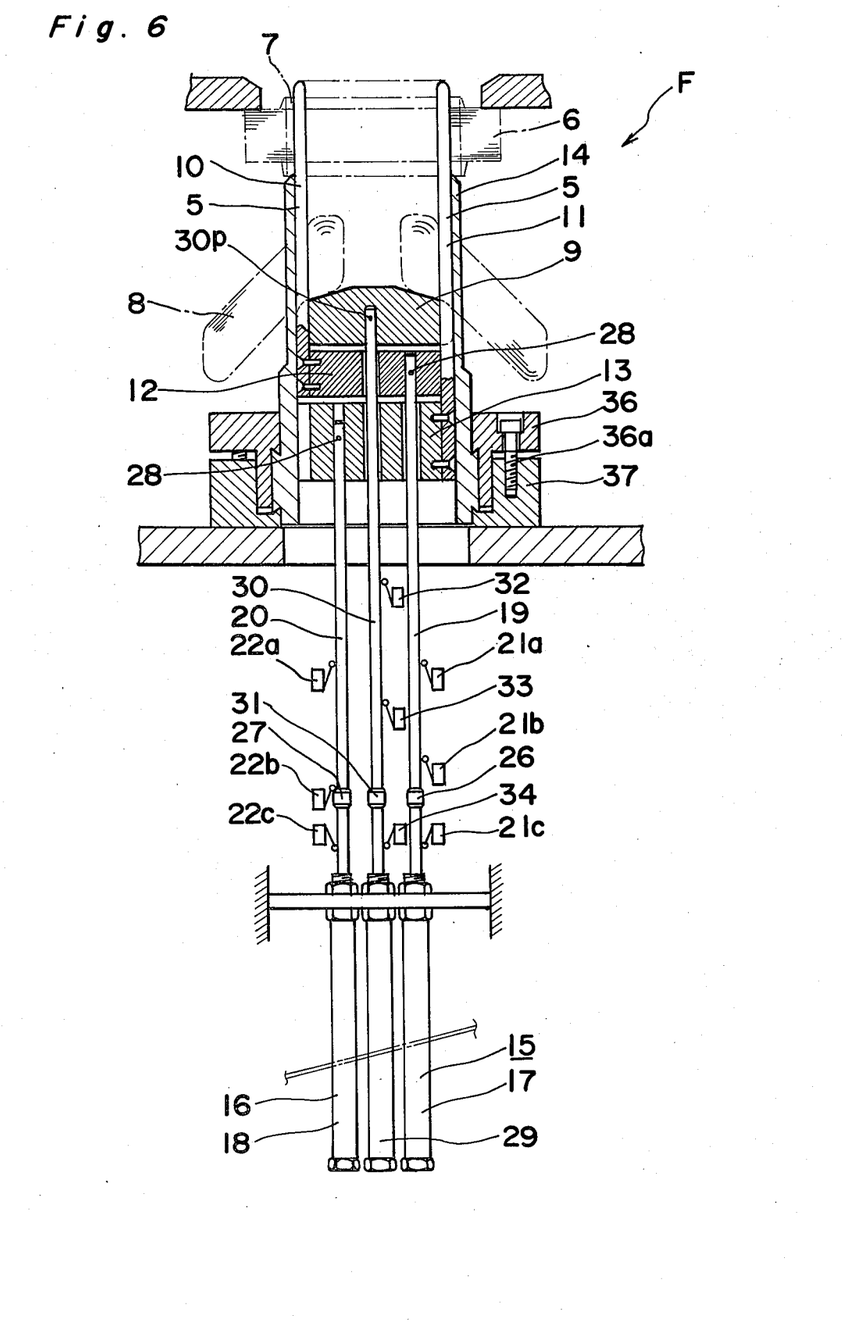
Figure 7:
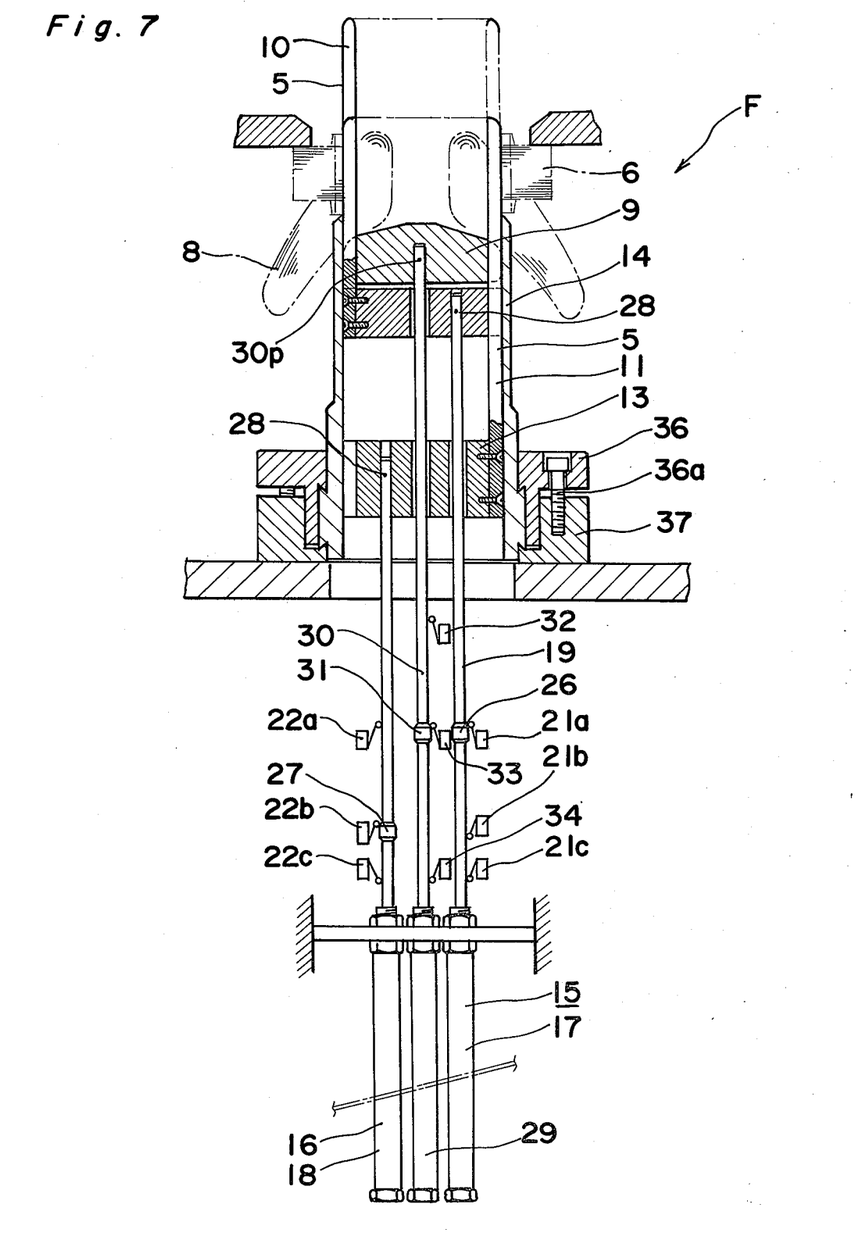
Figure 8:
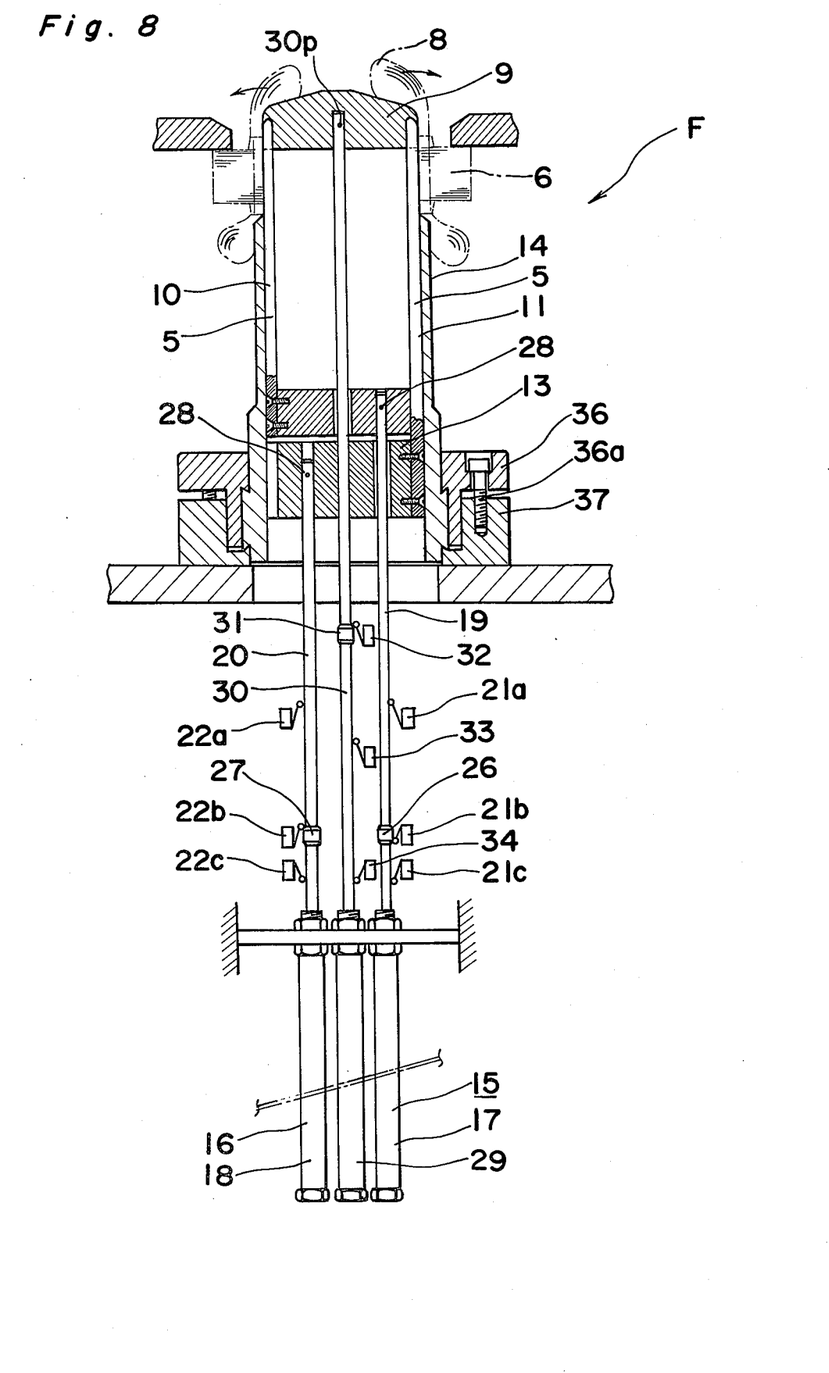

Firstly, in the coil insertion apparatus F in the state as shown in FIG. 4, by operating the blade driving and pusher driving hydraulic cylinders 17, 18 and 29, respective rods 19, 20 and 30, first and second blade holders 12 and 13 and coil pusher 9, and first and second blade groups 10 and 11 are sequentially raised. As shown in FIG. 6, the contact portion 27 of the rod 20 is preliminarily adjusted to actuate the limit switch 22b in a position where the tips of the blades of the second blade group 11 project out of the upper surface of the stator core 6 to a predetermined extent, and at this position, the rod 20 is stopped, while the second blade group 11 is also stopped, with the tips of the blades thereof extending upwardly from the upper surface of said stator core 6 to the predetermined extent. Meanwhile, the first blade group 10 and coil pusher 9 still continue to rise, and the parts of the coil 8 located between the blades 5 are pressed by the coil pusher 9 to effect the insertion of these parts of the coil 8 into the corresponding slots 7 of the iron core 6. In the first half stage where the insertion of a predetermined amount of the coil 8 is finished, the contact portion 26 provided on the rod 19 of the hydraulic cylinder 17 for raising the first blade group 10 actuates the microswitch 21a as shown in FIG. 7, and by the signal developed thereby, the hydraulic cylinder 15 is driven to cause the first blade group 10 to start lowering. As shown in FIG. 8, the contact portion 26 of the rod 19 is preliminarily adjusted to actuate the limit switch 21b in the course of its descent at a position where the tips of the blades of the first blade group 10 are located at the same height as the tips of the blades of the second blade group 11 so as to stop the rod 19 thereat.

Along with the descent and stopping of the first blade group 10, the coil pusher 9 continues to ascend, and the contact portion 31 of the rod 30 is preliminarily adjusted to actuate the limit switch 32 at a position where the upper surface of the coil pusher 9 extends above the tips of the blades 5 to a certain extent so as to stop the coil pusher 9 at this position as shown in FIG. 8, and thus, the insertion of the coil 8 into the stator core 6 is completed.

Subsequently, the stator core 6 in which the coil 8 has been thus inserted is removed, and the first and second blade groups 10 and 11 and the coil pusher 9 are lowered to such positions that the contact portions 26, 27 and 31 of the rods 19, 20 and 30 respectively actuate the microswitches 21c, 22c and 34 to prepare for the subsequent coil inserting process.

By the coil inserting operations as described in the foregoing, since the blades 5 of the first blade group 10, which are the blades 5 for guiding the coil 8 in association with the movement of the coil 8 by the coil pusher 9, are raised, there is no relative displacement between the first blade group 10 and the coil 8, and thus as possibility of damage to the coil 8 by the blades 5, and thus, favorable insertion of the coil 8 may be effected, while, in the latter half of the inserting operation, since all the blades 5 come to be located in a position below the upper end of the coil pusher 9, the coil 8 can readily move in a direction at right angles (i.e. in the direction shown by the arrow in FIG. 8) with respect to the direction of insertion, and therefore, as compared with the conventional inserting methods, there is the advantage that the insertion can be readily effected even when the circumferential length of the coil is shortened.

Hereinbelow, the coil inserting operations according to a second method of the present invention, which is suitable for insertion of a coil having a comparatively large wire diameter and is expected to encounter a great insertion resistance during the insertion, will be explained.

Figure 9:
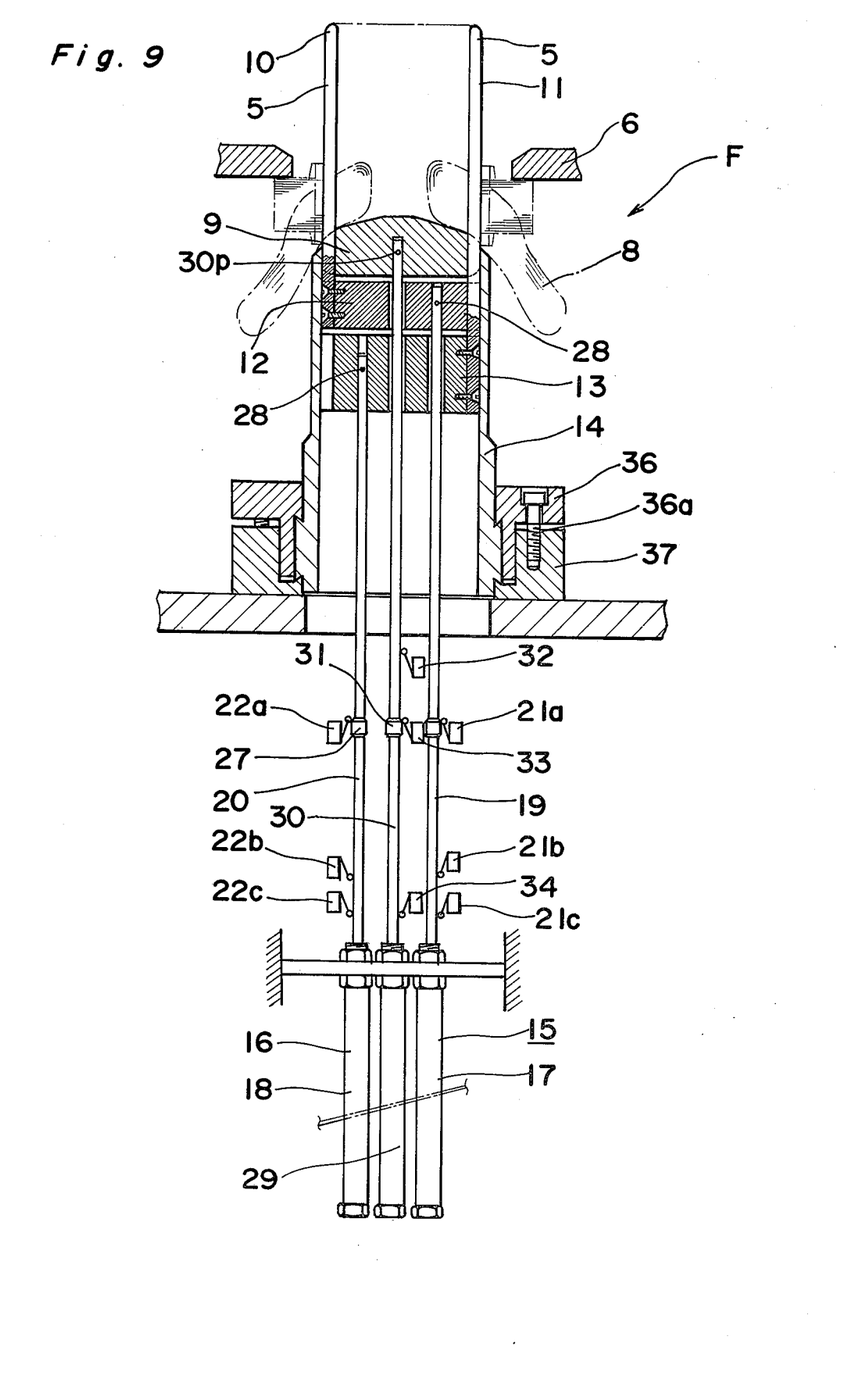
Figure 10:
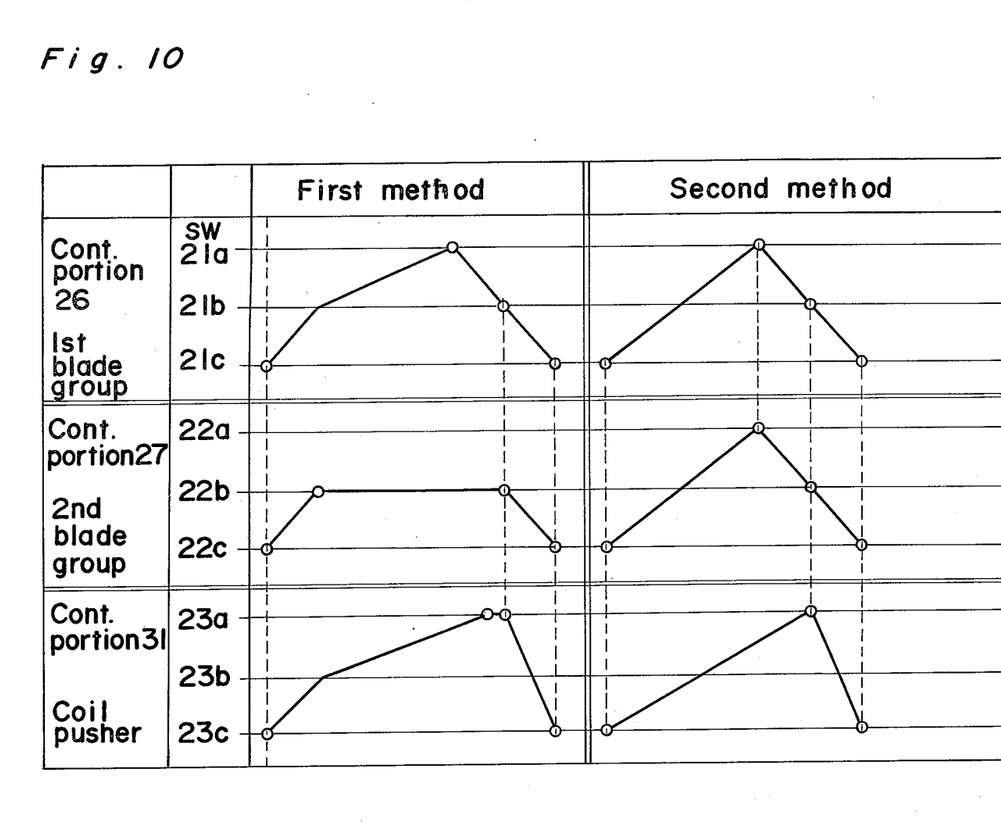
FIG. 10 is a timing chart explaining a first and a second coil insertion method according to the present invention.

In the first place, the driving hydraulic cylinders 17, 18 and 29 are operated to raise the respective rods 19, 20 and 30, first and second blade holders 12 and 13, and coil pusher 9, as shown in FIG. 9, up to a position where the inserting resistance becomes large, i.e. a position where the upper surface of the coil pusher 9 has risen to a certain extent, above a location approximately equal to the height of the under face of the stator core 6, all the blades 5 and the coil pusher 9 simultaneously ascending for effecting the insertion of the coil 8. the inserting function as described above continues up to a position at which the contact portion 31 of the rod 30 actuates the limit switch 33, and the first half stage of the inserting operation is finished at this time point. Thereafter, the rods 19 and 20 descend to lower the first and second blade groups 10 and 11, and as illustrated in FIG. 8, at a position where the upper ends of the blades 5 extend out of the upper surface of the stator core 6 to a predetermined extent, the contact portions 26 and 27 of the rods 19 and 20 actuate the limit switches 21b and 22b, at which time point, the lowering of the rods 19 and 20 is suspended. Even when the first and second blade groups 10 and 11 are stopped or descending, the coil pusher 9 continues to rise for effecting the latter half of the inserting function, which is generally the same as the first method described earlier, and through this process, the inserting operation is completed.

In the second inserting operations as described in the foregoing, since all the blades 5 and coil pusher 9 are simultaneously moved in the same direction in the first half stage where the insertion resistance is the largest, there is no relative movement with respect to the coil 8, and therefore, the insertion resistance is advantageously reduced to a large extent.

In the foregoing embodiment, although the first and second blade groups 10 and 11 and the coil pusher 9 are arranged to be positioned by the contact portions 26, 27 and 31 provided on the rods 19, 20 and 30 and the group of limit switches actuated by said contact portions, if known means capable of effecting continuous positioning such as linear scales, etc. which can be used for a similar purpose, is employed, it becomes possible to effect more complicated control of the blades and coil pusher.

In all of the arrangements described so far, in the case where the thickness of the stator core into which the coil is to be inserted, is altered, it is only required to change the positions of the limit switches which determine the upper limit of movement of the respective blades and coil pusher or to effect alteration of the upper limit position by the linear scale, etc., and thus, the apparatus can readily cope with specification alterations, as compared with the troublesome work required for the alterations in a conventional apparatus.

Figure 11:
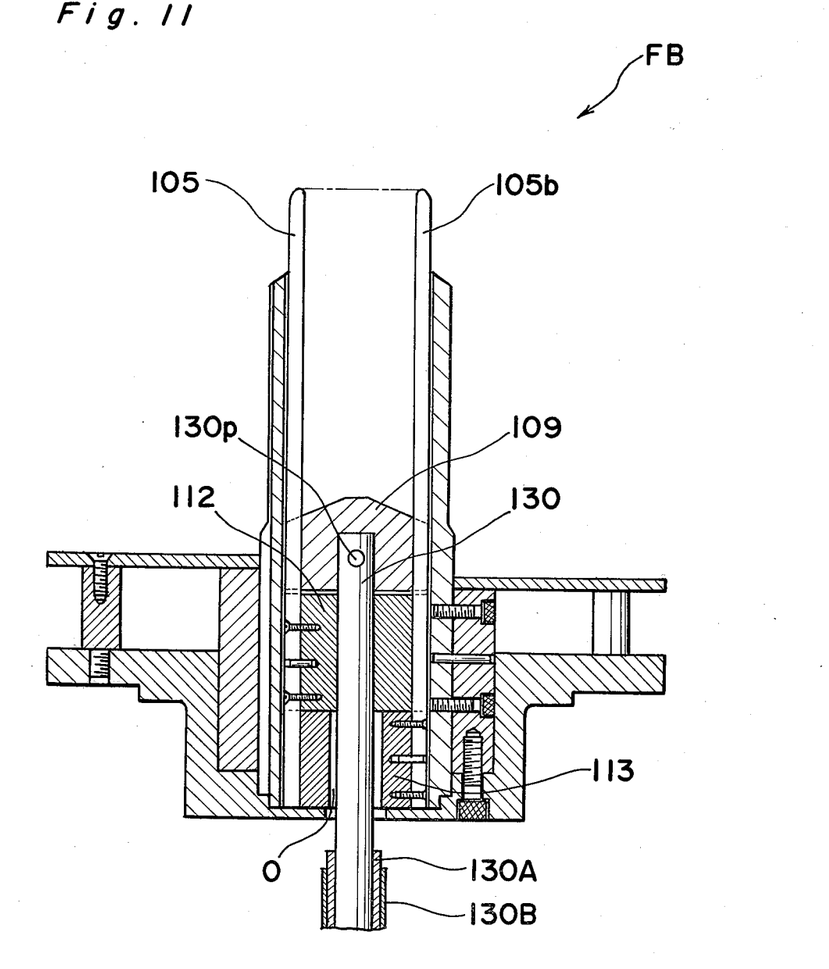
FIG. 11 is a longitudinal sectional view of blade portions of a coil insertion apparatus according to another embodiment of the present invention.
Figure 12:
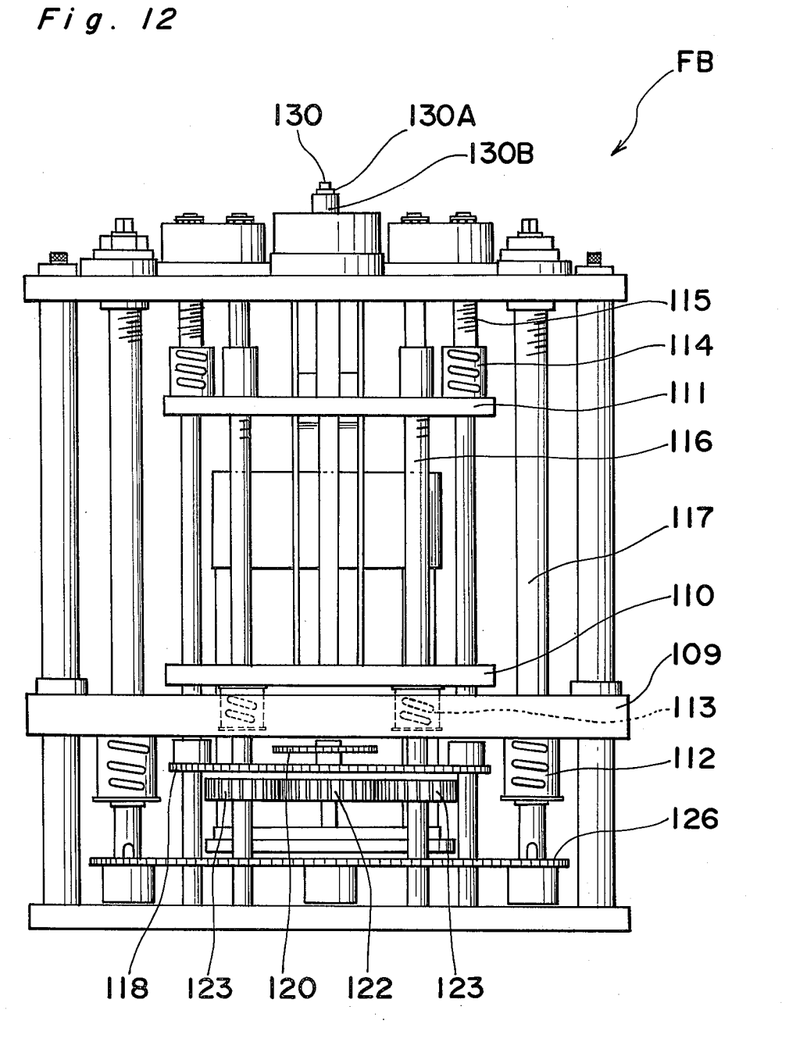
FIG. 12 is a side elevational view of a driving section of the coil insertion apparatus of FIG. 11.
Figure 13:
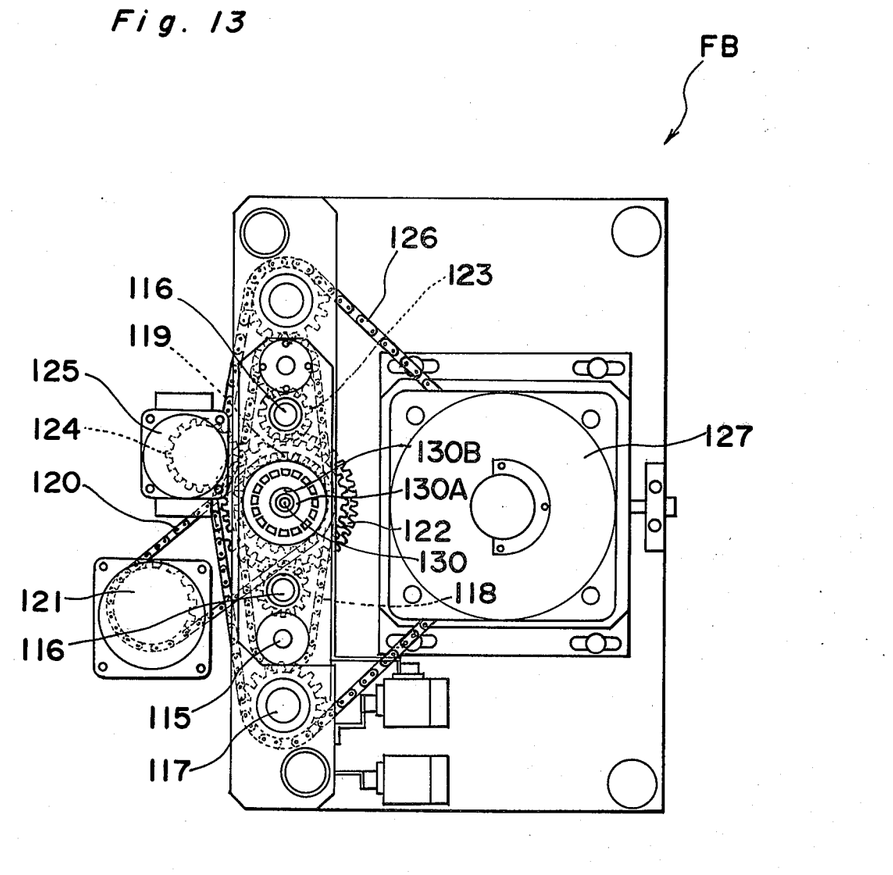
FIG. 13 is a top plan view of the coil insertion apparatus of FIG. 11.

Referring to FIGS. 11 to 13, there is shown a coil insertion apparatus FB according to another embodiment of the present invention.

In the embodiment of FIGS. 11 to 13, the hydraulic cylinders described as employed in the arrangement of FIGS. 4 to 9 are replaced by a linear motion mechanism employing threaded shafts and corresponding nuts as described hereinbelow.

The coil insertion apparatus FB of FIGS. 11 to 13 generally includes a coil pusher 109 fixed to one end of a vertically movable shaft 130 by a pin 130p, a first blade holder 112 to which one group of blades 105 constituted by every other blade of all the blades is secured, and which is slidably fitted onto said shaft 130, and a second blade holder 113 to which another group of blades 105b constituted by the blades other than those in the group of blades 105 is fixed and which is also slidably fitted onto the shaft 130 in a position below the first blade holder 112 for axial sliding movement with respect to said shaft 130, the diameter of an opening O formed in the second blade holder 113 which is fitted onto the shaft 130 being larger than that of the first blade holder 112.

Around the lower portion of the shaft 130, there is concentrically and slidably fitted a first hollow shaft 130A for an independent sliding movement with respect to said shaft 130, and the first hollow shaft 130A is arranged to pass through the opening O of the second blade holder 113 so that it may ascend to contact the under face of the first blade holder 112 for raising said first blade holder 112. A second hollow shaft 130B is further concentrically and slidably fitted around the first hollow shaft 130A for sliding movement independently of said first hollow shaft 130A, and is arranged to contact, at its forward end, the under face of the second blade holder 113 so as to raise said holder 113. The shaft 130, first hollow shaft 130A and second hollow shaft 130B are respectively secured to a set of spaced plates 110 and 111 (FIG. 12), and nuts 112, 113 and 114 are respectively fixed to a plate 109 and the plates 110 and 111, so that said plates can be vertically moved by rotation of corresponding threaded shafts 115, 116 and 117 respectively engaged with said nuts 112 to 114. The threaded shaft 115 is coupled to a motor 121 through a chain 118, two sprocket wheels 119, and another chain 120, and the threaded shaft 116 is coupled to a motor 125 through gears 122, 123 and 124 in mesh with each other, while the threaded shaft 117 is coupled to another motor 127 through a chain 126 respectively for independent rotation (FIG. 13).

In the above embodiment of FIGS. 11 to 13, since the motors are employed as driving sources, it is possible to set the speeds of the coil pusher and two blade groups to speeds most suitable for the coil insertion, while owing to the arrangement by which rotation is converted into linear motion, the height of the apparatus can be greatly reduced as compared with the case of driving by the hydraulic cylinders.

As is clear from the foregoing description, according to the coil insertion apparatus of the present invention, since the movement of blades is arranged to be independent of the movement of the coil pusher, it is possible to insert a coil having low coil ends and a short circumerential length into the stator core with a small insertion resistance, and thus, highly efficient electrical machines of still more compact size having superior characteristics and performance may be produced, while alterations of stator thickness, which have heretofore required very complicated procedures, can advantageously be dealt with by simple positional changes of limit switches or rotation control of motors, etc.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A coil insertion apparatus comprising:
  a plurality of blade members arranged in an annular configuration and spaced at predetermined intervals for guiding a coil into slots in a core of a stator for a rotary electrical machine, the plurality of blade members being divided into a plurality of groups of blade members;

a coil pusher within said annular configuration and vertically reciprocable in the axial direction of said blade members for inserting coil into the slots under pressure by utilizing said blade members as guides;

separate blade holders, one for each group of blade members, and to which the blade members of the respective groups are attached, said blade holders being movable in the axial direction of said blade members independently of each other;

an independent driving means for each of said plurality of blade holders and for said coil pusher, said blade holders and coil pusher being movable by said driving means through a distance for carrying coils to be inserted completely through the core; and control means operatively associated with said driving means and responsive to movement of said blade holders and said coil pusher to any one of a plurality of predetermined operative positions during the movement thereof and for controlling the operation of the corresponding driving means for carrying out a predetermined sequence of operations of the corresponding blade holder or coil pusher.

2. A coil insertion apparatus as claimed in claim 1 in which said driving means comprises a hydraulic piston-cylinder mechanism for each blade holder and said coil pusher, said mechanisms being operable independently of each other.

3. A coil insertion apparatus as claimed in claim 2 in which the piston member of each driving means has a piston rod connected to the corresponding blade holder or coil pusher for driving the corresponding blade holder or coil pusher, said piston rods having contact portions thereon, and said control means comprises limit switches along the length of said piston rods and engaged by said contact portions, said limit switches being shiftably positioned for being able to be shifted to change the position at which the operation of said apparatus is changed.

4. A coil insertion apparatus as claimed in claim 1 in which said driving means comprises a plurality of driving shafts, one connected to each of said blade holders and to said coil pusher, and motor means threadedly engaged with said shafts for independently rotating said shafts and moving them axially of the length thereof for driving said blade holders and said coil pusher.

5. A coil insertion apparatus as claimed in claim 4 in which said driving shafts have contact portions thereon, and said control means comprises limit switches along the length of said driving shafts and engaged by said contact portions, said limit switches being shiftably positioned for being able to be shifted to change the position at which the operation of said apparatus is changed.

* * * * *